(12) United States Patent
Dorgan et al.

(10) Patent No.: US 11,799,149 B2
(45) Date of Patent: Oct. 24, 2023

(54) ENERGY STORAGE ASSEMBLY (71) Applicant: GM GLOBAL TECHNOLOGY OPERATIONS LLC, Detroit, MI (US)

(72) Inventors: Karl C. Dorgan, West Bloomfield, MI (US); Anil Yadav, Troy, MI (US); Yangbing Zeng, Troy, MI (US); Konrad M. Brown, Allen Park, MI (US); Anandakrishnan S, Bengaluru (IN); Robert J. Schoenherr, Oxford, MI (US); Nicholas R. Bratton, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 17/003,222

(22) Filed: Aug. 26, 2020

(65) Prior Publication Data
US 2022/0069380 A1 Mar. 3, 2022

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/625* (2015.04); *H01M 10/6556* (2015.04); *H01M 10/6567* (2015.04); *H01M 50/20* (2021.01); *H01M 50/502* (2021.01); *H01M 10/617* (2015.04); *H01M 50/211* (2021.01); *H01M 50/249* (2021.01);
(Continued)

(58) Field of Classification Search
CPC ............. H01M 10/613; H01M 10/625; H01M 10/647; H01M 10/6554; H01M 10/6556; H01M 10/6567; H01M 2220/20; H01M 50/20; H01M 50/211; H01M 50/249; H01M 50/502; Y02E 60/10
See application file for complete search history.

(56) References Cited

U.S. PATENT DOCUMENTS 5,644,282 A 7/1997 Mehta et al.
6,103,075 A 8/2000 Winsel et al.
(Continued)

FOREIGN PATENT DOCUMENTS

CN 110444835 A 11/2019
DE 102016120165 A1 5/2017
WO 2020013120 A1 8/2021

*Primary Examiner* — Lingwen R Zeng
(74) *Attorney, Agent, or Firm* — Quinn IP Law (57) ABSTRACT

An energy storage assembly includes a plurality of battery cells electrically connected to each other to form a battery pack in which the battery cells are grouped together to form a first stack of cells and a second stack of cells. The energy storage assembly also includes a first barrier disposed between the first stack of cells and the second stack of cells to reduce heat transfer between the first stack of cells and the second stack of cells. The energy storage assembly further includes a coolant plate disposed along the battery cells. The coolant plate defines a channel for guiding a fluid therethrough to thermally transfer heat away from the battery cells. The coolant plate defines a slot spaced from the channel, and the slot axially aligns with the first barrier to reduce heat transfer between the first stack of cells and the second stack of cells.

20 Claims, 4 Drawing Sheets

(51) Int. Cl.
   *H01M 10/625* (2014.01)
   *H01M 10/6567* (2014.01)
   *H01M 10/6556* (2014.01)
   *H01M 50/20* (2021.01)
   *H01M 50/502* (2021.01)
   *H01M 50/211* (2021.01)
   *H01M 10/617* (2014.01)
   *H01M 50/249* (2021.01)

(52) U.S. Cl.
   CPC .......... *H01M 2220/20* (2013.01); *Y02E 60/10* (2013.01)

(56) References Cited

U.S. PATENT DOCUMENTS

| | | |
|---|---|---|
| 6,639,385 B2 | 10/2003 | Verbrugge et al. |
| 6,641,942 B1 | 11/2003 | Rouillard et al. |
| 7,109,685 B2 | 9/2006 | Tate, Jr. et al. |
| 7,324,902 B2 | 1/2008 | Verbrugge et al. |
| 7,373,264 B2 | 5/2008 | Verbrugge et al. |
| 7,612,532 B2 | 11/2009 | Verbrugge |
| 7,768,233 B2 | 8/2010 | Lin et al. |
| 7,928,690 B2 | 4/2011 | Koch et al. |
| 8,035,986 B2 | 10/2011 | Koetting et al. |
| 8,054,046 B2 | 11/2011 | Lin et al. |
| 8,059,404 B2 | 11/2011 | Miller et al. |
| 8,108,160 B2 | 1/2012 | Liu et al. |
| 8,170,818 B2 | 5/2012 | Lin et al. |
| 8,198,864 B2 | 6/2012 | Koch et al. |
| 8,212,519 B2 | 7/2012 | Koch et al. |
| 8,321,164 B2 | 11/2012 | Liu et al. |
| 8,581,543 B2 | 11/2013 | Koch et al. |
| 8,645,088 B2 | 2/2014 | Schaefer et al. |
| 8,836,280 B2 | 9/2014 | Koch et al. |
| 8,861,202 B2 | 10/2014 | Nassoiy |
| 9,172,118 B2 | 10/2015 | Marsh et al. |
| 9,176,194 B2 | 11/2015 | Meisner et al. |
| 9,178,192 B2 | 11/2015 | Payne |
| 9,337,484 B2 | 5/2016 | Verbrugge et al. |
| 9,354,277 B2 | 5/2016 | Lin et al. |
| 9,461,490 B2 | 10/2016 | Ying |
| 9,513,338 B2 | 12/2016 | Koch et al. |
| 10,431,411 B2 | 10/2019 | Fernandez et al. |
| 10,559,805 B2 | 2/2020 | Jones et al. |
| 2005/0266279 A1 | 12/2005 | Kim |
| 2011/0244293 A1 | 10/2011 | Khalighi et al. |
| 2011/0309838 A1 | 12/2011 | Lin et al. |
| 2012/0087091 A1 | 4/2012 | Nassoiy |
| 2014/0297084 A1 | 10/2014 | Meisner et al. |
| 2015/0017508 A1 | 1/2015 | Khakhalev |
| 2015/0162571 A1 | 6/2015 | Ogg et al. |
| 2015/0301116 A1 | 10/2015 | Baker et al. |
| 2015/0318502 A1 | 11/2015 | Kanai |
| 2016/0039419 A1 | 2/2016 | Wampler et al. |
| 2016/0077160 A1 | 3/2016 | Wampler, II et al. |
| 2016/0254562 A1 | 9/2016 | Morris-Cohen et al. |
| 2016/0259011 A1 | 9/2016 | Joe |
| 2016/0293991 A1 | 10/2016 | Goeltz et al. |
| 2016/0336552 A1 | 11/2016 | MacLean et al. |
| 2016/0372777 A1 | 12/2016 | Buckley et al. |
| 2017/0077507 A1 | 3/2017 | Harada et al. |
| 2018/0205125 A1* | 7/2018 | Burgers ............ H01M 10/6556 |
| 2018/0375132 A1 | 12/2018 | Li et al. |
| 2019/0051956 A1* | 2/2019 | Jeon ................. H01M 10/6556 |
| 2019/0126770 A1 | 5/2019 | Koch et al. |
| 2019/0148696 A1 | 5/2019 | Kaye et al. |
| 2019/0157710 A1 | 5/2019 | Makino et al. |
| 2019/0159347 A1 | 5/2019 | Ito et al. |
| 2019/0357386 A1 | 11/2019 | Coppola et al. |
| 2020/0295336 A1 | 9/2020 | Tallman et al. |

\* cited by examiner

ENERGY STORAGE ASSEMBLY

INTRODUCTION

The use of fully electric vehicles and hybrid vehicles (hybrid vehicles that use an internal combustion engine and an electric battery), such as for example, battery electric vehicles, hybrid electric vehicles, plug-in hybrid electric vehicles and fuel cell hybrid electric vehicles, has greatly increased over the last few years. Fully and partially electric vehicles generally include a rechargeable energy storage component, such as a high voltage battery. The performance and life-span of the rechargeable energy storage component may be improved by controlling exposure to excessively high temperatures, such as for example, a thermal runaway situation.

SUMMARY

The present disclosure provides an energy storage assembly including a plurality of battery cells electrically connected to each other to form a battery pack in which the battery cells are grouped together to form a first stack of cells and a second stack of cells. The energy storage assembly also includes a first barrier disposed between the first stack of cells and the second stack of cells to reduce heat transfer between the first stack of cells and the second stack of cells. The energy storage assembly further includes a coolant plate disposed along the battery cells. The coolant plate defines a channel for guiding a fluid therethrough to thermally transfer heat away from the battery cells. The coolant plate defines a slot spaced from the channel, and the slot axially aligns with the first barrier to reduce heat transfer between the first stack of cells and the second stack of cells.

In certain aspects, the battery cells each include a first end and a second end opposing each other along a longitudinal axis. Furthermore, in certain configurations, the slot is elongated axially relative to the longitudinal axis. Furthermore, the slot presents a length and a width defined by the coolant plate. Generally, the length of the slot is larger than the width of the slot. In certain configurations, the length of the slot is at least two times as large as the width of the slot. The length of the slot is disposed axially relative to the longitudinal axis.

In various aspects, the slot is further defined as a plurality of slots. Also, in various aspects, the channel snakes through the coolant plate to form a plurality of paths spaced from each other. At least one of the slots is disposed between the paths. In certain configurations, the at least one of the slots is further defined as one of the slots is disposed between the paths. In other configurations, the at least one of the slots is further defined as a plurality of slots disposed between the paths. Furthermore, in certain configurations, at least one of the slots disposed between the paths is larger than another one of the slots disposed between the same one of the corresponding paths. In addition, in various configurations, the coolant plate defines a first port in fluid communication with the channel, and the larger one of the slots is disposed closer to the first port than the another one of the slots.

Generally, in various configurations, the battery cells each include a first side and a second side opposing the corresponding first side of the battery cells.

In certain aspects, the energy storage assembly includes a thermal layer disposed between the first side of the battery cells and the coolant plate to transfer heat from the battery cells to the coolant plate. In certain configurations, the thermal layer separates the first barrier and the slot. In other configurations, the thermal layer defines a slit that aligns with the slot of the coolant plate and aligns with the first barrier.

In various configurations, the energy storage assembly includes a first side plate and a second side plate spaced from each other along a first axis. Generally, the battery cells are disposed between the first side plate and the second side plate in this configuration. Furthermore, the coolant plate is secured to the first side plate and the second side plate to close a bottom of the battery pack in this configuration.

In certain aspects, the paths and the slots are aligned in an alternating pattern. In one configuration, the paths and the slots are aligned in an alternating pattern relative to the first axis.

In one aspect, the energy storage assembly includes an insert disposed in the slot.

In various aspects, the paths are disposed in a parallel arrangement relative to each other to provide a parallel fluid flow through each of the paths.

In certain configurations, the coolant plate includes a top plate and a bottom plate, and the channel is further defined as a plurality of channels disposed between the top plate and the bottom plate. In this configuration, the slots are defined through the top plate and the bottom plate. Furthermore, in certain configurations, the top plate and the bottom plate are brazed together along respective edges of each of the slots to close respective sides of each of the channels. In addition, in other configurations, the top plate and the bottom plate are adhered together, mechanically fastened together or formed together as a plurality of extruded tube pieces secured to each other such that each of the extruded tube pieces surround a respective portion of the channel.

In certain aspects, the battery cells are grouped together to form a third stack of cells. The energy storage assembly includes a second barrier disposed between the second stack of cells and the third stack of cells in this configuration. Furthermore, in this configuration, at least another one of the slots aligns with the second barrier to reduce heat transfer between the second stack of cells and the third stack of cells.

The present disclosure also provides another energy storage assembly including a housing and a plurality of battery cells contained in the housing. The battery cells are electrically connected to each other to form a battery pack configured to power a load. The battery cells are grouped together to form a first stack of cells and a second stack of cells. The energy storage assembly further includes a first barrier disposed between the first stack of cells and the second stack of cells to reduce heat transfer between the first stack of cells and the second stack of cells. The energy storage assembly also includes a coolant plate disposed along the battery cells. The coolant plate closes a side of the housing. The coolant plate defines a channel for guiding a fluid therethrough to thermally transfer heat away from the battery cells. The coolant plate defines a slot spaced from the channel, and the slot axially aligns with the first barrier to reduce heat transfer between the first stack of cells and the second stack of cells.

In certain aspects, the coolant plate includes a top plate and a bottom plate. Therefore, in certain configurations, the channel is disposed between the top plate and the bottom plate, and the slot is defined through the top plate and the bottom plate.

The detailed description and the drawings or figures are supportive and descriptive of the disclosure, but the claim scope of the disclosure is defined solely by the claims. While some of the best modes and other configurations for carrying out the claims have been described in detail, various alternative designs and configurations exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

The phrase "at least one of" as used herein should be construed to include the non-exclusive logical "or", i.e., A and/or B and so on depending on the number of components.

Figure 1:
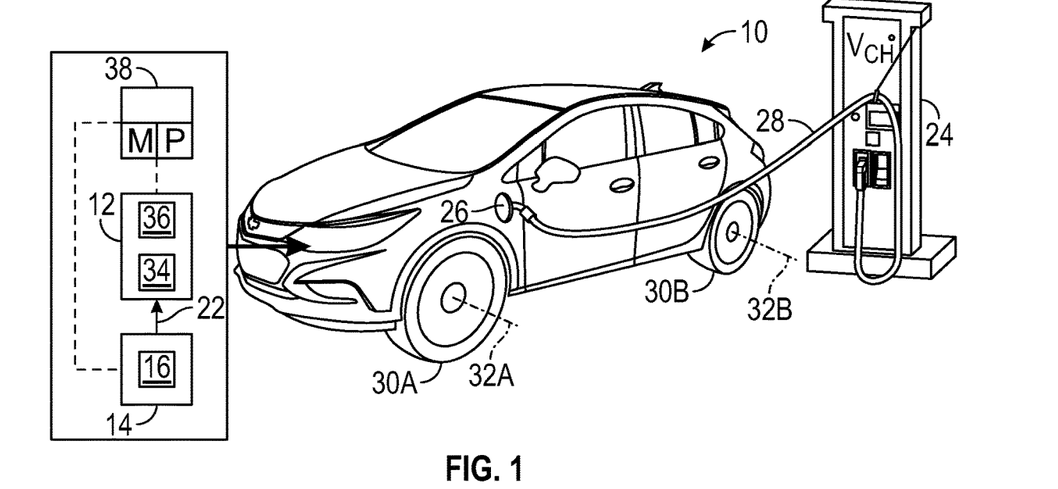
FIG. 1 is a schematic illustration of a movable platform at a charging station, with internal features of the movable platform enlarged outside of the movable platform for illustrative purposes.

Referring to the FIGS., wherein like numerals indicate like or corresponding parts throughout the several views, a movable platform 10, such as a vehicle is generally shown in FIG. 1. The movable platform 10 may include an electric powertrain 12 and a battery system 14, which may be a multi-pack battery system. In the depicted example configuration of FIG. 1, the electric powertrain 12 powers electric propulsion functions of the movable platform 10, which is a motor vehicle in FIG. 1.

Non-limiting examples of the movable platform 10, such as the vehicle, may include a car, a truck, a motorcycle, an off-road vehicle, a farm vehicle, a watercraft, an aircraft, rail vehicles, or any other suitable movable platform. Additionally, the vehicle may be a plug-in hybrid electric vehicle (PHEV), a hybrid electric vehicle (HEV), a battery electric vehicle (BEV), an all-electric vehicle (AEV), and a fuel cell electric vehicle (FCEV), etc. It is to be appreciated that alternatively, a non-vehicle application may be used, such as, farm equipment, stationary platforms, stationary or mobile power plants, robots, conveyors, transport platforms, etc. Therefore, the battery system 14 described herein may be used in rechargeable electrical systems for vehicle or non-vehicle applications. For illustrative purposes, the movable platform 10 of FIG. 1 will be described hereinafter in the context of a motor vehicle without limiting the present teachings to vehicle applications in general.

The battery system 14 may include an energy storage assembly 16, such as a battery or battery module, disposed within the movable platform 10 and configured for providing motive power to the electric powertrain 12. For example, the energy storage assembly 16 may be a secondary or rechargeable battery configured for converting energy and providing power to the electric powertrain 12 and/or other systems of the movable platform 10. In one example, the energy storage assembly 16 may provide power to an electric machine 34, such as an electric traction motor. Therefore, the energy storage assembly 16, such as the battery, may be useful for automotive applications, such as for example, the PHEV, the HEV, the BEV, the AEV, and the FCEV. The energy storage assembly may also be referred to as an energy storage device.

The energy storage assembly 16 may be used to store energy and power various components of the movable platform 10, including the electric machine 34, control systems, etc. The energy storage assembly 16 includes a plurality of battery cells 18 electrically connected to each other to form a battery pack 20. More specifically, the battery cells 18 are electrically connected to each other to form the battery pack 20 configured to power a load 22. The load 22 may be from the electric powertrain 12, the electric machine 34, one or more of the control systems of the vehicle, etc.

Further, although not shown, more than one battery pack 20 may be used. Therefore, the battery cells 18 may be combined to form a secondary battery pack, and so on depending on the desired application. That is, the secondary battery pack may be connected to one or more other battery packs 20. By way of example, the energy storage assembly 16 may be sufficiently sized to provide sufficient voltage for powering the PHEV, the HEV, the BEV, the AEV, and the like, e.g., approximately 300 to 400 volts or more, depending on the desired application.

The movable platform 10 is shown undergoing a direct current fast-charging (DCFC) operation in which the battery system 14 is electrically connected to an off-board DCFC station 24, e.g., via a vehicle charging port 26 connected to a body of the movable platform 10 that is internally connected to a DC charge connector (not shown) using a length of high-voltage charging cable 28.

The movable platform 10 may include front and rear wheels 30A, 30B, respectively. The front and rear wheels 30A, 30B may be connected to separate front and rear drive axles 32A, 32B. In an all-wheel drive (AWD) configuration, the drive axles 32A, 32B may be individually powered by separate rotary electric machines 34 each functioning as electric traction motors via corresponding power inverter module 36 as shown in FIG. 1. The electric machines 34 may be part of the electric powertrain 12.

The battery pack 20, which may use a lithium ion, zinc-air, nickel-metal hydride, lead acid, or other application-suitable battery chemistry, is selectively recharged via a DCFC charging voltage ($V_{CH}$) from the off-board DCFC station 24. When the movable platform 10 is in operation, modulated switching control is performed by a controller 38 via control signals to ultimately energize an electric machine 34 (see FIG. 1) to generate and deliver motor torque to one or more of the road wheels 30A, 30B, and to thereby propel the movable platform 10 and/or to perform other useful work. Thus, the battery pack 20 and the controller 38 together form the battery system 14, with other possible components such as thermal management/cooling (discussed below) and power electronic hardware.

The controller 38 includes a processor (P) and a memory (M), with the memory (M) including application-suitable amounts of tangible, non-transitory memory, e.g., read only memory, whether optical, magnetic, flash, or otherwise. The controller 38 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry. The controller 38 is programmed to execute instructions embodying the ability to control the battery system 14, such as charging the energy storage assembly 16 or powering various components of the vehicle.

During various operations of the vehicle, it is desirable to minimize thermal runaway. Thermal runaway may cause a short circuit in a battery system which results in accelerated propagation between battery cells 18. Therefore, the energy storage assembly 16 described herein includes features to reduce thermal runaway while preserving cooling performance during the various operations of the movable platform 10. For example, thermal runaway of the energy storage assembly 16 described herein may be reduced during the following example operations of the vehicle, such as DCFC or other charging of the battery pack 20, powering of electric powertrain 12, an interruption of the battery pack 20, etc.

Figure 2:
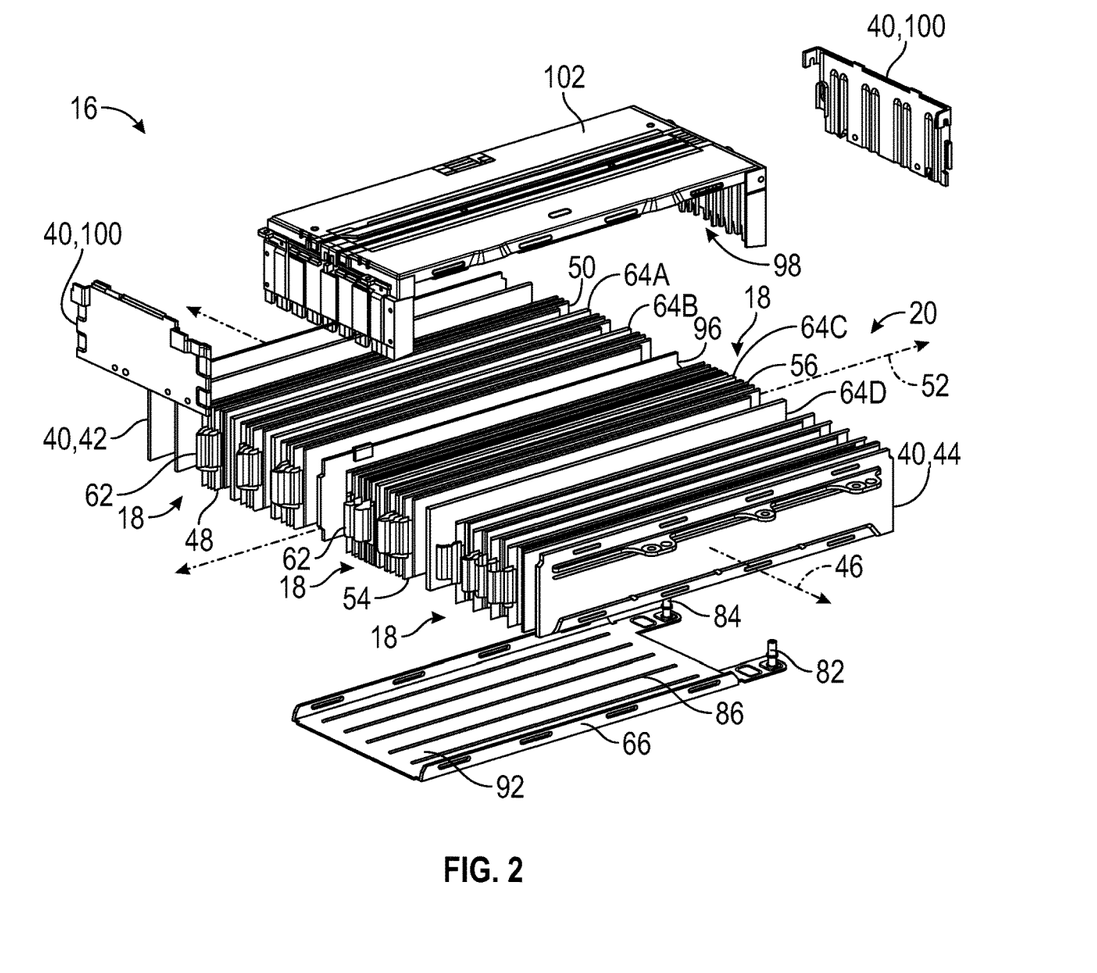
FIG. 2 is a schematic perspective partial exploded view of an energy storage assembly.
Figure 3:
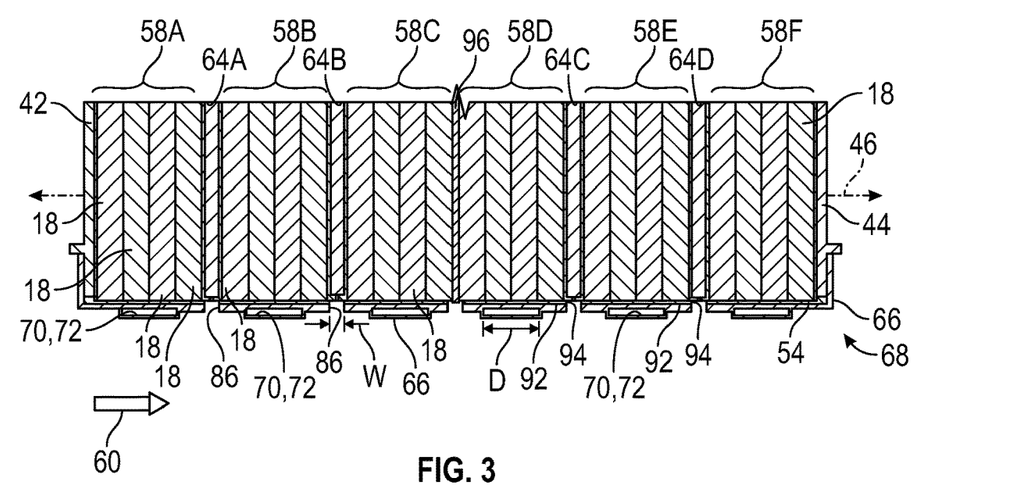
FIG. 3 is a schematic cross-sectional view of the energy storage assembly including a coolant plate of a first configuration.

Referring to FIGS. 2 and 3, generally, the energy storage assembly 16 may include a housing 40, and the battery cells 18 are contained in the housing 40. More specifically, the energy storage assembly 16 may include a first side plate 42 and a second side plate 44 spaced from each other along a first axis 46. The first side plate 42 and the second side plate 44 may each be part of the housing 40. The battery cells 18 are disposed between the first side plate 42 and the second side plate 44. For example, the battery cells 18 proximal to the first side plate 42 may be susceptible to thermal runaway as compared to the battery cells 18 proximal to the second side plate 44, which will be discussed further below.

As best shown in FIG. 2, generally, the battery cells 18 may each include a first end 48 and a second end 50 opposing each other along a longitudinal axis 52. Generally, the first axis 46 and the longitudinal axis 52 are disposed transverse relative to each other. Furthermore, the battery cells 18 may each include a first side 54 and a second side 56 opposing the corresponding first side 54 of the battery cells 18.

The battery cells 18 may be grouped together to form a first stack of cells 58A and a second stack of cells 58B. Any suitable number of battery cells 18 may be grouped together to form the first stack of cells 58A and the second stack of cells 58B. For example, one or more battery cells 18 may be grouped together to form the first stack of cells 58A, and similarly, one or more battery cells 18 may be grouped together to form the second stack of cells 58B. The first stack of cells 58A are disposed closer to the first side plate 42 than the second stack of cells 58B. In other words, the second stack of cells 58B are spaced farther from the first side plate 42 than the first stack of cells 58A are from the first side plate 42.

Furthermore, the battery cells 18 may be arranged to have any suitable number of stacks of cells 58A-58F. Therefore, for example, the battery cells 18 may be grouped together to form a third stack of cells 58C. In addition, the battery cells 18 may be grouped together to form a fourth stack of cells 58D, etc. For illustrative purposes, FIG. 3 illustrates six stacks of cells 58A-58F. Therefore, one or more battery cells 18 may be grouped together to form each of the stacks of cells 58A-58F.

Referring to FIG. 2, the battery cells 18 may be stacked or arranged in the battery pack 20 and connected in a series electrical arrangement or in a parallel electrical arrangement. Therefore, the first stack of cells 58A and the second stack of cells 58B may be stacked or arranged in the battery pack 20 and connected in the series electrical arrangement or in the parallel electrical arrangement. During normal operation of the battery pack 20, heat transfer is generally from the stack of cells 58A-58F toward a coolant plate 66 (discussed further below) to keep a temperature of each of the battery cells 18 as uniform as possible. When the battery pack 20 is in thermal runaway, generally, heat transfer through the battery pack 20 may occur, for example, from the first stack of cells 58A toward the second stack of cells 58B. That is, the battery cells 18 are hottest closest to the first side plate 42, and the battery cells 18 cool off the farther away from the first side plate 42 in the direction of arrow 60 in FIG. 3. The arrow 60 may be generally parallel to the first axis 46. Therefore, for example, the first stack of cells 58A may be susceptible to thermal runaway as compared to the second stack of cells 58B, which will be discussed further below. It is to be appreciated that any of the stacks of cells 58A-58F may be susceptible to thermal runaway and the above thermal runaway example applies to any adjacent stack of cells 58A-58F.

The battery cells 18 may be any suitable configuration to store energy and provide power. For example, the battery cells 18 may be cylindrical, prismatic, rectangular, etc. Furthermore, the battery cells 18 may be a can-type lithium ion battery cell or a pouch-type cell, including but not limited to, lithium manganese, lithium ion phosphate, lithium cobalt, lithium nickel-based cells, etc. Therefore, for example, the battery pack 20 may be variously configured as a rechargeable lithium-ion or nickel-cadmium battery pack.

Turning back to FIG. 2, each of the battery cells 18 may include one or more cell tabs 62. More specifically, the battery cells 18 may each include a cell tab 62. For example, the cell tab(s) 62 of each of the battery cells 18 may extend outwardly from at least one of the first end 48 and the second end 50 of the corresponding one of the battery cells 18. As another example, the cell tab(s) 62 of each of the battery cells 18 may extend outwardly from at least one of the first side 54 and the second side 56 of the corresponding one of the battery cells 18. Generally, the cell tabs 62 of the battery cells 18 may be connected in the series electrical arrangement or in the parallel electrical arrangement regardless of the location of the cell tab(s) 62 at the first end 48/the second end 50 or the first side 54/the second side 56 or combinations thereof. For illustrative purposes, the cell tabs 62 are shown in FIG. 2 extending from the first and second ends 48, 50 of the corresponding battery cells 18.

Referring to FIG. 3, the energy storage assembly 16 further includes a first barrier 64A disposed between the first stack of cells 58A and the second stack of cells 58B to reduce heat transfer between the first stack of cells 58A and the second stack of cells 58B. The first barrier 64A may be positioned between individual ones of the battery cells 18 and/or between stacks 58A, 58B of the battery cells 18 arranged in respective battery pack 20. More specifically, the first barrier 64A is formed of one or more materials and one or more layers to create a thermal barrier to reduce heat transfer between the first stack of cells 58A and the second stack of cells 58B.

The first stack of cells 58A may be susceptible to thermal runaway, and thus, heats up more than the second stack of cells 58B. As such, the first barrier 64A is configured to absorb heat from the first stack of cells 58A to minimize heat transfer to the second stack of cells 58B. Therefore, the first barrier 64A acts to dissipate heat before reaching the second stack of cells 58B. Referring to FIG. 3, as one non-limiting example, the first barrier 64A is positioned between the first stack of cells 58A having four battery cells 18, and the second stack of cells 58B having four battery cells 18. The first barrier 64A may also be referred to as a first thermal barrier.

Continuing with FIG. 3, the energy storage assembly 16 may also include a second barrier 64B disposed between the second stack of cells 58B and the third stack of cells 58C. More specifically, the second barrier 64B is formed of one or more materials and one or more layers to create a thermal barrier to reduce heat transfer between the second stack of cells 58B and the third stack of cells 58C. The second barrier 64B functions in the same manner as the first barrier 64A. That is, the second barrier 64B is configured to absorb heat from the second stack of cells 58B to minimize heat transfer to the third stack of cells 58C. Therefore, the second barrier 64B acts to dissipate heat before reaching the third stack of cells 58C. The second barrier 64B may also be referred to as a second thermal barrier.

Any suitable number of barriers 64A-64D may be used, and for illustrative purposes, FIG. 3 illustrates four barriers 64A-64D. The barriers 64A-64D, such as the first barrier 64A and the second barrier 64B, etc., mitigate thermal propagation in a situation with excessive temperatures that may have resulted from operation of one or more of the battery cells 18. Therefore, generally, the barriers 64A-64D act to dissipate heat before reaching the next stack of cells 58A-58F. The barriers 64A-64D may be formed of one layer or a plurality of layers. Furthermore, one or more of the barriers 64A-64D may be formed of one layer and one or more of the barriers 64A-64D may be formed of the plurality of layers. The layers may be formed of one or more materials, and non-limiting examples of the materials are discussed next.

The first barrier 64A and the second barrier 64B (and any additional barriers 64C, 64D) may be formed of any suitable materials to reduce heat transfer, and non-limiting examples may include one or more of foam(s), metal(s), fiber(s), polymer(s), alloy(s), phase changing material(s), etc. More specific non-limiting examples of the first barrier 64A and the second barrier 64B, etc., may include one or more of fine glass fibers, amorphous silica glass fibers, mica, polyimide form, amorphous silica fiber, vulcanized silicone, silicate wool, graphite, pyrogenic silica, urethane foam polymer, silicone foam, ceramic fiber microcrystalline fibers, aluminum, etc. With regard to the phase changing material, the phase change material is configured to undergo an endothermic phase change reaction when a temperature of one of the battery cells 18 is at or above an activation temperature. In other words, the endothermic phase change reaction enables heat absorption from the battery pack 20 when the temperature is at or above the activation temperature.

Referring to FIGS. 2 and 3, the energy storage assembly 16 also includes the coolant plate 66 disposed along the battery cells 18. Generally, the coolant plate 66 is configured to thermally transfer heat away from the battery cells 18. The coolant plate 66 includes additional features discussed below to prevent thermal propagation while preserving cooling performance.

Generally, the coolant plate 66 closes a side of the housing 40. In certain configurations, the coolant plate 66 is secured to the first side plate 42 and the second side plate 44 to close a bottom 68 of the battery pack 20. The battery cells 18 are aligned inside of the housing 40 so that the first side 54 or the second side 56 of the battery cells 18 are disposed adjacent to the coolant plate 66. As such, heat transfer may occur from the battery cells 18 along the first side 54 or the second side 56 to the coolant plate 66. In FIGS. 2 and 3, for illustrative purposes, the first side 54 of the battery cells 18 are disposed along the coolant plate 66.

Referring to FIGS. 3-8, the coolant plate 66 defines a channel 70 for guiding a fluid therethrough to thermally transfer heat away from the battery cells 18. Generally, the fluid flowing through the coolant plate 66 is a liquid fluid, and non-limiting examples may include coolant, oil, water, etc.

The channel 70 snakes through the coolant plate 66 to form a plurality of paths 72 spaced from each other. For example, the paths 72 may be disposed substantially parallel to each other. In one configuration, the paths 72 are disposed substantially parallel to each other relative to the longitudinal axis 52. As such, the paths 72 may be disposed in a parallel arrangement relative to each other to provide a parallel fluid flow through each of the paths 72. The parallel arrangement of the paths 72 as well as the paths 72 being the same size relative to each other provides a balanced fluid flow through the channel 70. In other words, the fluid flow through each of the paths 72 is substantially the same.

As mentioned above, the first stack of cells 58A may be susceptible to thermal runaway. The coolant plate 66 heats up more where the coolant plate 66 aligns with the first stack of cells 58A due to the first stack of cells 58A heating up more than the other stack of cells 58B-58F. As such, the coolant plate 66 away from the first stack of cells 58A gradually cools off in the direction of the arrow 60 in FIG. 3. As such, the path(s) 72 that align with the first stack of cells 58A is most susceptible to vapor lock. Vapor lock may occur when the stack of cells 58A heat up so much that the fluid inside the aligning path 72 boils to the point where the liquid fluid becomes a vapor and the vapor within that path 72 prevents the liquid fluid from flowing through that path 72 and possibly preventing the liquid fluid from flowing through the other paths 72 depending on the configuration of the channel 70.

Figure 5:
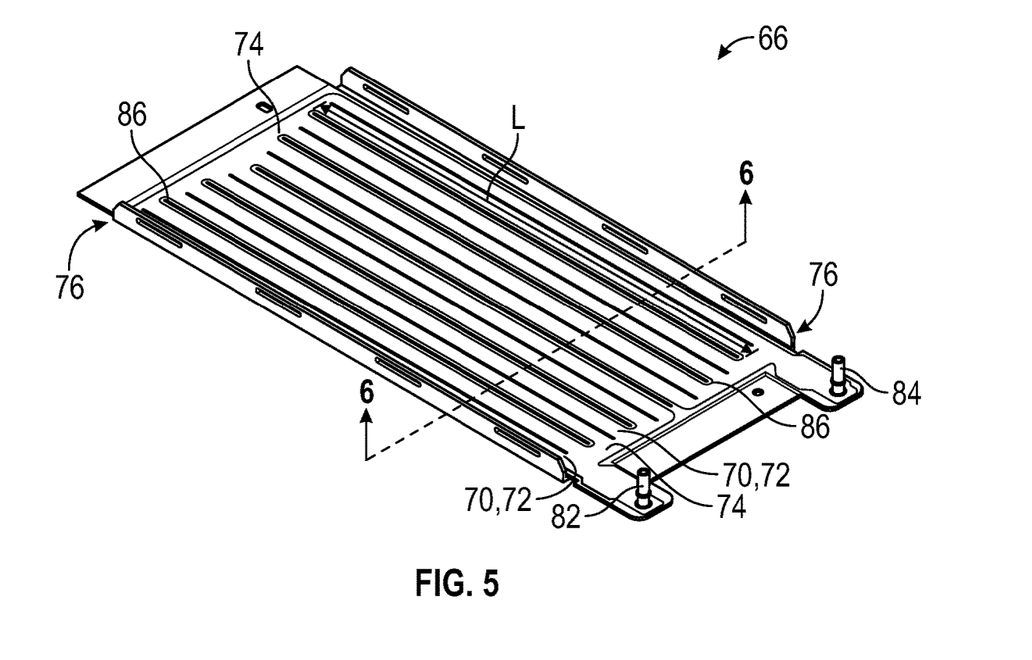
FIG. 5 is a schematic perspective view of a coolant plate of a second configuration.
Figure 7:
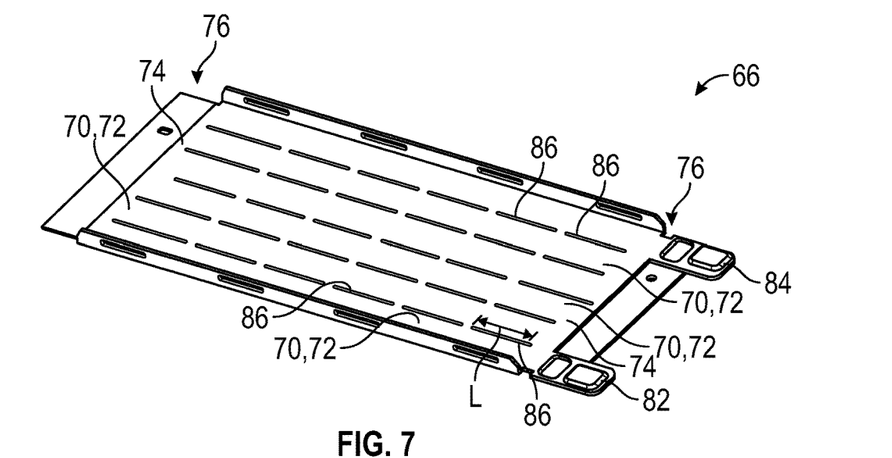
FIG. 7 is a schematic perspective view of a coolant plate of a third configuration.
Figure 8:
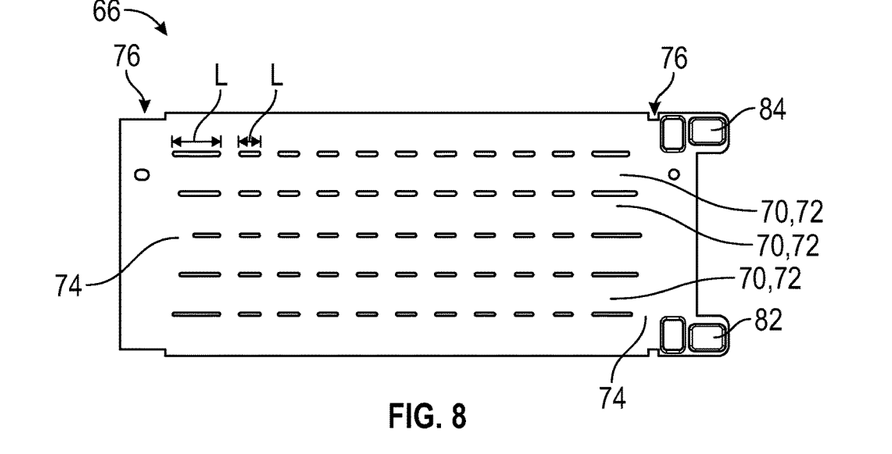
FIG. 8 is a schematic perspective view of a coolant plate of a fourth configuration.

Therefore, the channel 70 described herein may form one or more connectors 74 (see FIGS. 5, 7 and 8) to fluidly connect each of the paths 72 to avoid a situation where the fluid cannot flow through any of the paths 72 due to vapor lock. As shown in FIGS. 5, 7, and 8, the paths 72 are fluidly connected via the connectors 74 at distal ends 76 of the paths 72. Via connecting the paths 72 at the distal ends 76 with the connectors 74, if one of the paths 72 becomes vapor locked, then the vapor locked path 72 may be bypassed due to the parallel arrangement of the paths 72, and the fluid will continue through the channel 70 to continue to cool the other battery cells 18. As such, the parallel arrangement of the paths 72 provides the parallel fluid flow which allows the path 72 that becomes vapor locked to be bypassed. Therefore, the configuration of the coolant plate 66 preserves cooling performance of the battery pack 20.

Figure 4:
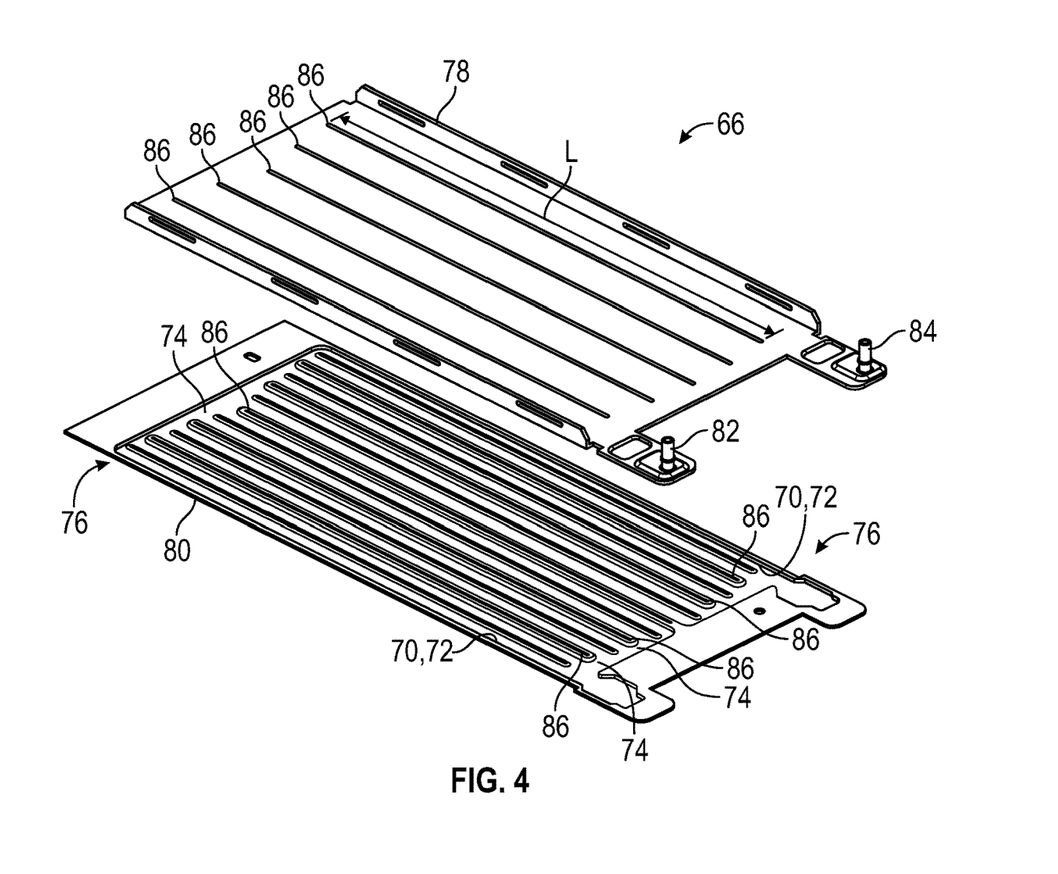
FIG. 4 is a schematic exploded perspective view of the coolant plate of FIG. 3.
Figure 6:
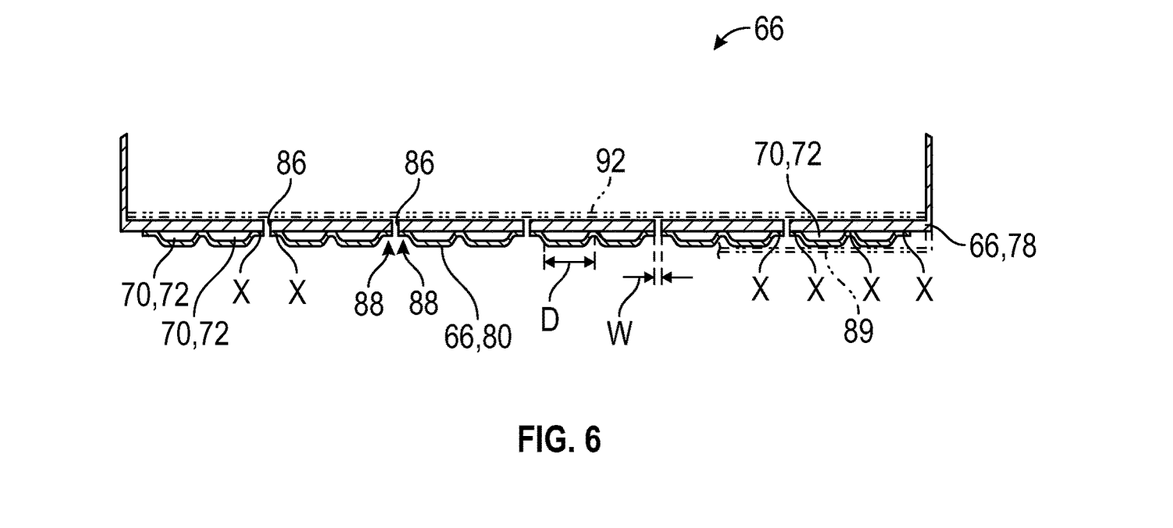
FIG. 6 is a schematic cross-sectional view of the coolant plate taken from lines 6-6 of FIG. 5.

As best shown in FIGS. 4 and 6, in certain configurations, the coolant plate 66 may include a top plate 78 and a bottom plate 80. Generally, the channel 70 is disposed between the top plate 78 and the bottom plate 80. As such, the paths 72 are disposed between the top plate 78 and the bottom plate 80. In certain configurations, the channel 70 is further defined as a plurality of channels 70 disposed between the top plate 78 and the bottom plate 80. That is, the channels 70 are arranged to form each of the paths 72. The configuration of the coolant plate 66 in FIGS. 7 and 8 may have the top plate 78 and the bottom plate 80 as illustrated in FIGS. 4 and 6, even though an exploded view or cross-sectional view is not also provided for FIGS. 7 and 8.

The coolant plate 66 may define a first port 82 in fluid communication with the channel 70, and the coolant plate 66 may define a second port 84 in fluid communication with the channel 70. For example, the fluid may be guided into the channel 70 via the first port 82 and the fluid may be guided out of the channel 70 via the second port 84 or vice versa. The channel 70 snakes through the coolant plate 66 between the first port 82 and the second port 84. Generally, the first stack of cells 58A is disposed proximal to the first port 82. That is, the first stack of cells 58A may be disposed closer to the first port 82 than the second stack of cells 58B.

Other features have been added to the coolant plate 66 to further reduce heat transfer. For example, referring to FIGS. 3-9, the coolant plate 66 defines a slot 86 to reduce heat transfer. In certain configurations, the slot 86 is defined through the top plate 78 and the bottom plate 80. Generally, the slot 86 is spaced from the channel 70. The slot 86 axially aligns with the first barrier 64A to reduce heat transfer between the first stack of cells 58A and the second stack of cells 58B. For example, if the coolant plate 66 is in the orientation of FIG. 3, the slot 86 aligns under the first barrier 64A. The slot 86 creates a break between the battery cells 18 that forces the heat to dissipate into the first barrier 64A. Furthermore, the slot 86 creates a break in the coolant plate 66 which reduces heat transfer through the coolant plate 66 in the direction of the arrow 60 in FIG. 3.

As best shown in FIGS. 5, 7, and 8, generally, the slot 86 is elongated axially relative to the longitudinal axis 52. The slot 86 presents a length L and a width W defined by the coolant plate 66. Furthermore, the length L of the slot 86 is larger than the width W of the slot 86. In certain configurations, the length L of the slot 86 is disposed axially relative to the longitudinal axis 52. For example, the length L of the slot 86 may be at least two times as large as the width W of the slot 86.

In certain configurations, the slot 86 is further defined as a plurality of slots 86. More specifically, the slots 86 are defined through the top plate 78 and the bottom plate 80 of the coolant plate 66 (as best shown in FIGS. 4 and 6). At least another one of the slots 86 aligns with the second barrier 64B to reduce heat transfer between the second stack of cells 58B and the third stack of cells 58C. Each of the slots 86 presents the length L and the width W discussed above. In certain configurations, as best shown in FIGS. 3 and 6, the width W of the slots 86 is smaller than a width D of the paths 72. The slots 86 may be defined through the top plate 78 and the bottom plate 80 in FIGS. 7 and 8, which are not exploded views.

Generally, at least one of the slots 86 is disposed between the paths 72 as shown in FIGS. 3-8. In certain configurations, the at least one of the slots 86 is further defined as one of the slots 86 is disposed between the paths 72 (see FIGS. 3 and 6). In other words, in certain configurations, a single slot 86 is disposed between a pair of paths 72. In other configurations, the at least one of the slots 86 is further defined as a plurality of slots 86 disposed between the paths 72 (see FIGS. 7 and 8). In other words, in certain configurations, more than one of the slots 86 are disposed between a pair of the paths 72. In one configuration, the plurality of slots 86 are spaced from each other in a row between the pair of the paths 72. It is to be appreciated that the slots 86 may be any suitable configuration to reduce heat transfer.

As such, in certain configurations, the paths 72 and the slots 86 are aligned in an alternating pattern. More specifically, the paths 72 and the slots 86 are aligned in the alternating pattern relative to the first axis 46. For example, a single slot 86 may be disposed between a pair of the paths 72 (see FIGS. 3 and 4). As another example, a plurality of slots 86, that form a single row, may be disposed between a pair of the paths 72 (see FIGS. 7 and 8). As yet another example, a plurality of slots 86, that form a plurality of rows next to each other, may be disposed between a pair of the paths 72. As yet another example, a plurality of paths 72, that form a plurality of rows next to each other, may be disposed between a pair of the slots 86 (see FIGS. 5 and 6).

Furthermore, in certain configurations, at least one of the slots 86 disposed between the paths 72 is larger than another one of the slots 86 disposed between the same one of the corresponding paths 72 (see FIG. 8). That is, generally, one or more slots 86 in a row between a pair of the paths 72 may be different sizes from each other. In certain configurations, the larger one of the slots 86 is disposed closer to the first port 82 than the another one of the slots 86. For example, the larger slot(s) 86 may be referring to the length L of the slot(s) 86 being greater than the length L of other slot(s) 86 and/or the width of the slot(s) 86 being greater than the width of other slot(s) 86.

Turning back to the process of forming the coolant plate 66, the coolant plate 66 may be formed by various methods. For example, the top plate 78 and the bottom plate 80 may be brazed together to secure the plates 78, 80 together. The top plate 78 and the bottom plate 80 may be brazed together along the slot 86. More specifically if using the plurality of slots 86, the top plate 78 and the bottom plate 80 may be brazed together along the slots 86. In certain configurations, the top plate 78 and the bottom plate 80 may be brazed together along respective edges 88 of the slot 86 to close respective sides of the paths 72. Furthermore, the top plate 78 and the bottom plate 80 may be brazed together at locations away from the slots 86 to close other sides 54, 56 of the paths 72. More specifically, the top plate 78 and the bottom plate 80 may be brazed together along respective edges 88 of each of the slots 86 to close respective sides of each of the channels 70. The top plate 78 and the bottom plate 80 may be brazed together at other locations to close edges of adjacent paths 72 as well. As other examples, the top plate 78 and the bottom plate 80 are adhered together, mechanically fastened together or formed together as a plurality of extruded tube pieces secured to each other such that each of the extruded tube pieces surround a respective portion of the channel 70. As such, the top and bottom plates 78, 80 may be adhered together via an adhesive. Furthermore, the top and bottom plates 78, 80 may be mechanically fastened together via one or more fasteners, bolts, screws, clips, couplers, etc. With regard to extruding the pieces of the top and bottom plates 78, 80, each of the extruded tube pieces may be part of the top and bottom plates 78, 80 that surround one or more of the paths 72, and elongated edges of each of the extruded tube pieces fit together to form the slots 86 between each of the extruded tube pieces, and then each of the extruded tube pieces are secured to each other to complete the coolant plate 66. FIG. 6 identifies example locations X to secure the top and bottom plates 78, 80 together via adhesive, mechanical fasteners, or where each of the extruded tube pieces can be joined to a respective one of the extruded tube pieces, which is representative of any of the configurations herein. The adhesive/brazing/attachment, etc., width is sufficiently sized to allow the top and bottom plates 78, 80 to be secured together.

Referring to FIG. 6, optionally, the coolant plate 66 may include a carrier plate 89 that supports the bottom plate 80. In this configuration, the bottom plate 80 is disposed between the top plate 78 and the carrier plate 89. The carrier plate 89 is partially shown in phantom lines (dash-dot-dot-dash lines) in FIG. 6 to illustrate the general location of where the carrier plate 89 is located relative to the bottom plate 80. It is to be appreciated that any of the configurations herein may optionally include the carrier plate 89. Furthermore, it is to be appreciated that any suitable number of carrier plates 89 may be used. For example, a plurality of carrier plates 89 may be stacked on top of each other to provide the desired structural support. As another example, one carrier plate 89 may be used to provide the desired structural support instead of the plurality of carrier plates 89.

Figure 9:
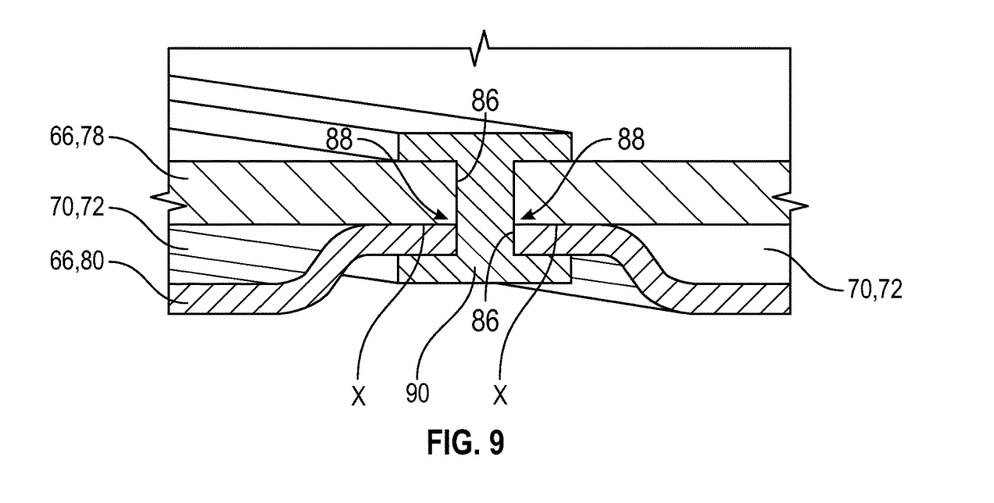
FIG. 9 is a schematic fragmentary perspective view of an insert disposed inside a slot of any of the coolant plates described herein.

Referring to FIG. 9, optionally, one or more of the slots 86 may be filled with a material. Therefore, in certain configurations, the energy storage assembly 16 may include an insert 90 disposed in the slot 86. The insert 90 may assist in heat absorption, and thus, transfer heat away from the battery cells 18. When using a plurality of slots 86, the insert 90 may be further defined as a plurality of inserts 90, and the inserts 90 are disposed in each of the slots 86. The insert 90 may be formed of any suitable material and non-limiting examples may include polymer(s), foam(s), etc.

Referring to FIGS. 3 and 6, the energy storage assembly 16 may also include a thermal layer 92 disposed between the first side 54 of the battery cells 18 and the coolant plate 66 to transfer heat from the battery cells 18 to the coolant plate 66. More specifically, the thermal layer 92 may be disposed between the first side 54 of the battery cells 18 and the top plate 78 of the coolant plate 66. The thermal layer 92 is configured to thermally transfer heat away from the battery cells 18. In certain configurations, the thermal layer 92 separates the first barrier 64A and the slot 86 (see phantom lines (dash-dot-dot-dash lines) in FIG. 6). In other configurations, the thermal layer 92 defines a slit 94 that aligns with the slot 86 of the coolant plate 66 and aligns with the first barrier 64A (see FIG. 3). It is to be appreciated that any configuration of the thermal layer 92 may be used in any of the coolant plate 66 configurations herein. The thermal layer 92 may be formed of an adhesive layer. Furthermore, the thermal layer 92 may be referred to as a thermal interface material (TIM).

The energy storage assembly 16 may include other features not discussed in detail herein. For example, the energy storage assembly 16 may include a mid-plate 96 (see FIG. 3) disposed between a pair of the stack of cells 58A-58F to provide structural support to the battery pack 20. Referring to FIG. 2, the energy storage assembly 16 may include an integrated charger battery 98 (ICB), an ICB cover 100, a thermistor 102, a wire harness, etc.

While the best modes and other configurations for carrying out the disclosure have been described in detail, those familiar with the art to which this disclosure relates will recognize various alternative designs and configurations for practicing the disclosure within the scope of the appended claims. Furthermore, the configurations shown in the drawings or the characteristics of various configurations mentioned in the present description are not necessarily to be understood as configurations independent of each other. Rather, it is possible that each of the characteristics described in one of the examples of a configuration can be combined with one or a plurality of other desired characteristics from other configurations, resulting in other configurations not described in words or by reference to the drawings. Accordingly, such other configurations fall within the framework of the scope of the appended claims.

What is claimed is:

1. An energy storage assembly comprising:
    a plurality of battery cells electrically connected to each other to form a battery pack in which the battery cells are grouped together to form a first stack of cells and a second stack of cells;
    a first barrier disposed between the first stack of cells and the second stack of cells to reduce heat transfer between the first stack of cells and the second stack of cells;
    a coolant plate disposed along the battery cells, and wherein the coolant plate defines a channel for guiding a fluid therethrough to thermally transfer heat away from the battery cells; and
    wherein the first barrier is not in contact with the channel of the coolant plate;
    wherein the coolant plate defines a slot separated from the channel via a wall which isolates the slot and the channel from each other, and the slot axially aligns with the first barrier to reduce heat transfer between the first stack of cells and the second stack of cells.

2. The energy storage assembly as set forth in claim 1 wherein the battery cells each include a first end and a second end opposing each other along a longitudinal axis, and the slot is elongated axially relative to the longitudinal axis.

3. The energy storage assembly as set forth in claim 2 wherein:
    the slot presents a length and a width defined by the coolant plate;
    the length of the slot is larger than the width of the slot; and
    the length of the slot is disposed axially relative to the longitudinal axis.

4. The energy storage assembly as set forth in claim 3 wherein the length of the slot is at least two times as large as the width of the slot.

5. The energy storage assembly as set forth in claim 1 wherein:
    the slot is further defined as a plurality of slots;
    the channel snakes through the coolant plate to form a plurality of paths spaced from each other;
    at least one of the slots is disposed between the paths; and
    the wall is further defined as a plurality of walls, and a respective one of the walls surround each of the slots to isolate the slots and the paths from each other such that the paths and the slot are disconnected from each other.

6. The energy storage assembly as set forth in claim 5 wherein the at least one of the slots is further defined as one of the slots is disposed between a respective pair of the paths.

7. The energy storage assembly as set forth in claim 5 wherein the at least one of the slots is further defined as a plurality of slots disposed between a respective pair of the paths.

8. The energy storage assembly as set forth in claim 5 wherein:
    at least one of the slots disposed between the paths is larger than another one of the slots disposed between the same one of the corresponding paths; and
    the coolant plate defines a first port in fluid communication with the channel, and the larger one of the slots is disposed closer to the first port than the another one of the slots.

9. The energy storage assembly as set forth in claim 1:
wherein the battery cells each include a first side and a second side opposing the corresponding first side of the battery cells; and
further including a thermal layer disposed between the first side of the battery cells and the coolant plate to transfer heat from the battery cells to the coolant plate.

10. The energy storage assembly as set forth in claim 9 wherein the thermal layer separates the first barrier and the slot.

11. The energy storage assembly as set forth in claim 9 wherein the thermal layer defines a slit that aligns with the slot of the coolant plate and aligns with the first barrier.

12. The energy storage assembly as set forth in claim 1 wherein:
the slot is further defined as a plurality of slots;
the channel snakes through the coolant plate to form a plurality of paths spaced from each other; and
the paths and the slots are disposed in an alternating pattern.

13. The energy storage assembly as set forth in claim 1:
further including a first side plate and a second side plate spaced from each other along a first axis, and the battery cells are disposed between the first side plate and the second side plate;
wherein the coolant plate is secured to the first side plate and the second side plate to close a bottom of the battery pack;
wherein the slot is further defined as a plurality of slots;
wherein the channel snakes through the coolant plate to form a plurality of paths spaced from each other; and
wherein the paths and the slots are disposed in an alternating pattern relative to the first axis.

14. The energy storage assembly as set forth in claim 1 further including an insert disposed in the slot.

15. The energy storage assembly as set forth in claim 1 wherein:
the channel snakes through the coolant plate to form a plurality of paths spaced from each other; and
the paths are disposed in a parallel arrangement relative to each other to provide a parallel fluid flow through each of the paths.

16. The energy storage assembly as set forth in claim 1 wherein:
the coolant plate includes a top plate and a bottom plate;
the channel is further defined as a plurality of channels disposed between the top plate and the bottom plate;
the slot is further defined as a plurality of slots, and the slots are defined through the top plate and the bottom plate; and
the top plate and the bottom plate are brazed together along respective edges of each of the slots to close respective sides of each of the channels such that the channels and the slots are isolated from each other.

17. The energy storage assembly as set forth in claim 1 wherein:
the coolant plate includes a top plate and a bottom plate;
the channel is further defined as a plurality of channels disposed between the top plate and the bottom plate;
the slot is further defined as a plurality of slots, and the slots are defined through the top plate and the bottom plate; and
the top plate and the bottom plate are adhered together, mechanically fastened together or formed together as a plurality of extruded tube pieces secured to each other such that each of the extruded tube pieces surround a respective portion of the channel such that the channels and the slots are isolated from each other.

18. The energy storage assembly as set forth in claim 1:
wherein the battery cells are grouped together to form a third stack of cells;
further including a second barrier disposed between the second stack of cells and the third stack of cells;
wherein the slot is further defined as a plurality of slots; and
wherein at least another one of the slots aligns with the second barrier to reduce heat transfer between the second stack of cells and the third stack of cells.

19. An energy storage assembly comprising:
a housing;
a plurality of battery cells contained in the housing, and wherein the battery cells are electrically connected to each other to form a battery pack configured to power a load;
wherein the battery cells are grouped together to form a first stack of cells and a second stack of cells;
a first barrier disposed between the first stack of cells and the second stack of cells to reduce heat transfer between the first stack of cells and the second stack of cells;
a coolant plate disposed along the battery cells, and wherein the coolant plate closes a side of the housing;
wherein the coolant plate defines a channel for guiding a fluid therethrough to thermally transfer heat away from the battery cells; and
wherein the coolant plate defines a slot separated from the channel that is adjacent to the slot via a wall of the coolant plate which isolates the slot and the channel from each other, and the slot axially aligns with the first barrier to reduce heat transfer between the first stack of cells and the second stack of cells.

20. The energy storage assembly as set forth in claim 19 wherein:
the coolant plate includes a top plate and a bottom plate;
the channel is disposed between the top plate and the bottom plate;
the slot is defined through the top plate and the bottom plate, and
the top plate and the bottom plate abut each other around the slot to form the wall that isolates the channel and the slot from each other such that the channel and the slot are disconnected from each other.

* * * * *